(12) United States Patent
Winther

(10) Patent No.: US 6,409,434 B1
(45) Date of Patent: Jun. 25, 2002

(54) DEVICE FOR MANIPULATION OF OBJECTS ON A PNEUMATIC SURFACE

(75) Inventor: Kaspar Tobias Winther, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/494,260

(22) Filed: Jan. 28, 2000

Related U.S. Application Data

(60) Provisional application No. 60/118,129, filed on Feb. 1, 1999.

(51) Int. Cl.[7] .............................................. B65G 51/16
(52) U.S. Cl. .......................................... 406/15; 406/88
(58) Field of Search ............................. 406/13, 14, 15, 406/26, 88, 198; 414/676

(56) References Cited

U.S. PATENT DOCUMENTS

| | | | | |
|---|---|---|---|---|
| 3,797,889 A | * | 3/1974 | Wilkinson | 302/2 R |
| 4,702,664 A | * | 10/1987 | Lukens | 414/676 |
| 5,439,341 A | * | 8/1995 | Yamazaki et al. | 414/676 |
| 5,634,636 A | * | 6/1997 | Jackson et al. | 271/225 |
| 5,803,979 A | * | 9/1998 | Hine et al. | 134/2 |
| 6,045,319 A | * | 4/2000 | Uchida et al. | 414/676 |
| 6,220,056 B1 | * | 4/2001 | Ostendarp | 65/175 |

* cited by examiner

*Primary Examiner*—Christopher P. Ellis
*Assistant Examiner*—Joe Dillon, Jr.
(74) *Attorney, Agent, or Firm*—James Magee, Jr.

(57) ABSTRACT

This invention provides a pneumatic active surface capable of sensing, locating, and moving an object on the surface by selective activation of individual segments or portions of the surface. The active surface comprises an array of pneumatic conduits, which are individually adapted to carry air to the surface or suck air from the surface. The tubes are arranged so that the end walls of each tube form a relatively flat surface with air conduits provided by the bores of the tubes. The term pneumatic refers to the air flow patterns at the surface resulting from the blowing and sucking functions of the tubes. The appropriate choice of force, caused by blowing or sucking air flow through an array of tubes of the pneumatic active surface device, causes objects placed on the array of tubes to be moved in useful ways.

12 Claims, 4 Drawing Sheets

DEVICE FOR MANIPULATION OF OBJECTS ON A PNEUMATIC SURFACE

This application claims benefit to Provisional 60/118,129 filed Feb. 1, 1999.

BACKGROUND OF THE INVENTION

This invention relates to movement and control of objects.

The current lack of manufacturing techniques for very high volume handling of small objects presents a technology barrier to commercial success in various fields of Microsystems technology (MST) such as microelectromechanical systems (MEMS). A fundamentally new approach to automated massive parallel manipulation of small-sized objects or parts is needed and is provided by this invention.

Mass production of miniature components such as integrated circuits, micro electromechanical systems (MEMS), and the like, requires fundamental innovations in parts handling. Components of such systems are built using microfabrication processes derived from VLSI technology, which allows the manufacture and handling of thousand or millions of components in parallel. The pneumatic active surface device (PASD) disclosed herein uses a new approach to automated object manipulation. Instead of handling a single object directly, for example, with a robot gripper, a pneumatic active surface device can be used to manipulate multiple objects simultaneously. This new automation device permits parallel and distributed, sensing and actuation, and is particularly attractive for handling batch microfabricated objects, whose small dimensions and large numbers don't allow conventional pick and place operations with robot grippers. Accordingly, there is a particular need for methods and equipment to provide such capability.

SUMMARY OF THE INVENTION

This invention provides a pneumatic active surface capable of sensing, locating, and moving, holding, and releasing an object on the surface by selective activation of the blow or suck function of individual tubes or groups of tubes of the surface. Sequential blowing or sucking of a gaseous fluid through the selected tubes creates vibrations and fluid flow patterns which cause the object to move. Sucking on a tube or group of tubes causes the object to be fastened or fixed to that region of the surface. Blowing raises the object or a portion of the object above the surface.

The active surface comprises an array of pneumatic conduits which are individually adapted to carry a gaseous fluid such as air to the surface or draw from the surface. In the case of tubes the tubes which are the conduits are arranged so that the end wall of each tube form a relatively flat surface with air conduits provided by the bores of the tubes. The term "tube" or "tubes" refer to a slender channel, usually circular, within a body. The surface could be in the form of a flat body such as a wafer of suitable material and thickness having a plurality of passages or conduits from top to bottom drilled or constructed therethrough. The lower surface of the body is connected to the fluid sources and the sensors and valves can be carried within the channel which passes through the body. The tubes or conduits may be distributed over a relatively wide surface with substantial spacing between them depending on the size and geometry of the objects to be manipulated. For convenience, description of the device of this invention may hereafter be expressed in terms of tubes, it being understood that the term "tubes" is not limited to separable cylindrical conduits. The term "pneumatic" refers to the gaseous fluid flow patterns at the surface resulting from the blowing and sucking functions of the conduits or tubes.

A pneumatic active surface device, PASD, which can be programmed to locate and control motion of an object, is provided by this invention. The appropriate choice of force, caused by blowing or sucking air flow through tubes of the pneumatic active surface device, is shown to cause objects placed on the array of tubes to be moved in useful ways. The device of this invention, as disclosed herein, offers great flexibility and speed and it can be employed to position, orient, identify, sort, feed, and assemble parts or objects. In addition multiple objects can be controlled simultaneously.

A preferred device of this invention provides a new process or method of handling objects that can be embodied in a variety of different devices or products. The invention is used to accurately locate, hold, position and move objects. Briefly, in accordance with a preferred embodiment of the present invention the device includes an active pneumatic surface that comprises a bundle of parallel tubes arranged so that the wallends of the tubes or the body surface between the conduits form a smooth surface, herein called the active pneumatic surface. This is the surface on which an object is observed and handled. The tubes are adapted by available support devices to selectively conduct air to and from the surface through the bore of each individual tube. The airflow through the bore of each tube is controlled individually through the use of suitable variable position valves such as 2- or 3-position valves or proportional valves. In one position pressurized air is supplied to the tube, in the other position a vacuum is drawn generating a sucking action. Three way valves provide a position which the gas flow is neither positive or negative but corresponds to ambient conditions. The pressurized air is used to push an object away while the vacuum is used to pull an object or draw it to the surface. As the object moves valves are opened and closed as needed. Air streams below, above, and around the object co-act to modify the position of the object and the path it will follow as it is moved around on the active surface. The air streams can be used to achieve translational, rotational, and flipping motion. The term "flipping" refers to juxtaposition of the opposite surfaces of the object as hereinafter described.

A sensor such as a force sensor, a pressure or gaseous fluid flow sensor is attached to each tube between the active surface and the valve. If a vacuum is drawn and an object covers the end of a tube, then the pressure in that tube will drop more than if the tube is not covered. By reading the pressure or gas flow rate in each tube while a vacuum is drawn the location of an object on the surface is identified. A computer can be used to process and display the sensor output and also to control the position of the individual valves suitable sensors include pressure, flow rate, and force sensors.

DETAILED DESCRIPTION OF THE INVENTION

The pneumatic active surface system of this invention comprises an array or bundle of parallel tubes, the upper adjacent ends of which make up a smooth surface which provides the pneumatic active surface of the object handling system of the invention. This is the surface on which an object is observed and handled. The tubes lead air to and from the surface. The direction of airflow through each tube is controlled by the use of 2-position valves. One valve per tube is preferred. In one position pressurized air is supplied to the tube, in the other position a vacuum is drawn generating a sucking action. The pressurized air is used to push an object away while the vacuum is used to pull an object or draw it to the surface. As the object moves individual valves are opened and closed as needed. Air streams below, above, and around the object modify the position of the object and the path it follows. The air streams can be used to achieve translational, rotational, and flipping motion. A pressure sensor is attached to each tube between the active surface and the valve. When a vacuum is drawn and an object covers the end of a tube, then the pressure or air flow rate in that tube will drop more than in a tube not covered. By reading the pressure in each tube while a vacuum is drawn the location of an object on the surface is determined. A computer, including separate electronics, is used to process and display the sensor outputs. The computer can be used to control the position of the individual valves.

Figure 1:
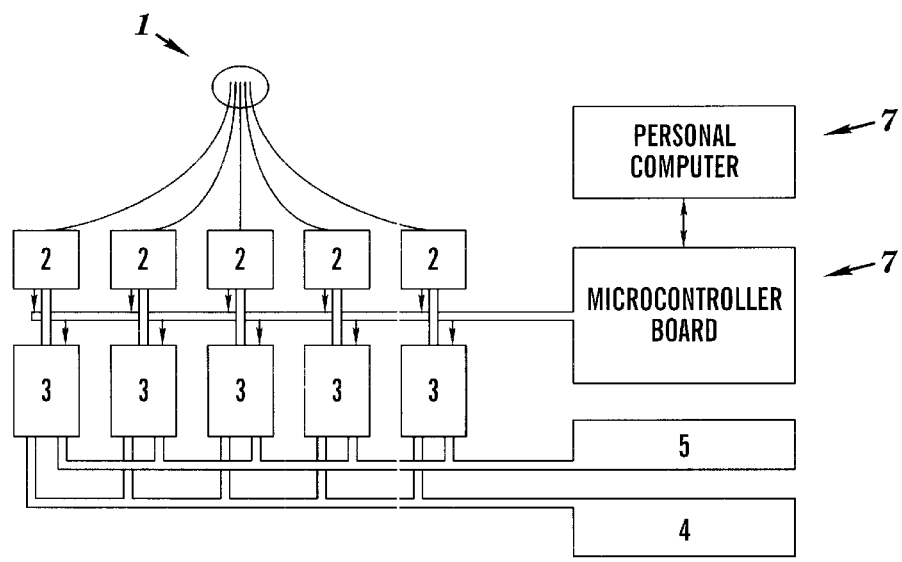
FIG. 1 shows a schematic drawing of the device, with tubes, valves, sensors and control means including a computer and a circuit board.

A simplified drawing of an embodiment of the pneumatic active surface device is shown in FIG. 1. The figure is schematic and shows only a few tubes 1, valves 3, sensors 2, the vacuum 4, air 5, and electrical lines 6, and the computer 7.

In the following paragraphs preferred components and embodiments of the system are described in more detail. A personal computer is used for man-machine communication and to show the measured position of the objects on the active surface device. A camera, can be used for visual control.

Active surface: A pneumatic active surface can be constructed of gaseous fluid flow conduits such as capillary glass tubes mounted in a base such as a block of polycarbonate and secured with an adhesive such as an epoxy resin At the surface the tubes are arranged in a hexagonal pattern of closest packing. At the opposite end of the block the glass tubes interface with the vacuum and compressed air pressure lines. The dimensions, of the tubes are determined by the nature and size of the objects being handled. A flat wafer-like body can be provided with surface to surface conduits that function as tubes can also be used as the surface or a portion of the surface.

Air connections and pressure sensors: Each of the tubes goes to a T-connector onto which the pressure sensor is mounted. From the T-connector another tube goes to the valve. The air volume in the capillary glass tube between the active surface and the valve is maintained the same volume for each of the tubes to ensure a uniform response time for all tubes.

Valves and air/vacuum supply: The valves used are small 3-way, 2-position solenoid valves. They are placed on a platform with internal ducts for air and vacuum supply and through holes for connections to the tubes leading to the T-connections. The vacuum and compressed air tubes from the T-connectors can be mounted using epoxy. The supply ducts are hooked up to air and vacuum manifolds with regular intervals to avoid pressure variations along the ducts.

Herein, the sensors may, for convenience, be described as pressure sensors. However, it is to be understood that any suitable sensor embodiment capable of response to the direction and magnitude of the fluid flow in the tubes of the active surface device is within the contemplation of the invention.

Electrical connections: The valves and the sensors have electrical connections to a circuit board. The board contains a number of multiplexers some of which are used for changing the state, open or closed, of the valves and others for addressing a particular sensor to get a reading from it Once the state of a valve has been changed it remains so until changed again. In one embodiment of the invention, only one valve or sensor is addressed at a time, however, they are addressed very fast (much faster than the valve response time) meaning that in practice numerous valves can be changed almost at the same time.

The active surface device of this invention can be used to observe, move, position, hold and actively release objects of widely different geometric shapes, sizes, and physical characteristics.

Some of the primary functional capabilities of the PASD include:

Moving. Motion is achieved by the combined action of pressurized air and/or suction. It is well controlled in one plane: 2 Cartesian plus one rotational degrees of freedom, less well controlled in the other dimensions.

Holding. The suction force can be used to hold a part up against the active surface.

Releasing. Pressurized air can be used to actively release a part from the surface.

Sensing. The shape and location of a part can be identified in two dimensions based on either the vacuum achieved in the different tubes or on airflow rates.

The PASD of the invention can handle a wide variety of object geometry and reduces need for tool changes frequently required for robot pick and place operations.

Multiple parts can be moved independent of each other at the same time.

A controlled force can be applied, depending on the number of cells blowing and sucking.

An object can be gripped at selected sites on its lower surface by sucking on selected tubes rather than indiscriminately all over like a traditional suction-cup.

Objects can be actively released from the surface by blowing, a feature that is particularly important for very small objects that tend to stick to traditional grippers.

Potential applications for utilization of the pneumatic active surface device of this invention include:

Gripper or jig: The device can perform functions of a traditional end effector on a traditional robot arm, i.e., a gripper, robot hand, suction cup device, and the like. However, besides gripping and releasing the end effector has inherently 3 degrees of freedom build into it. For example, a robot with a large spatial motion capability can be used to move the active surface device around as an end effector. The end effector PASF is moved to the part and used to grip the part. The coarse motion system is then used to move the part close to the desired location, where the part is reoriented and repositioned on the active surface until it has the desired position at which point the part is actively released thereby overcoming surface forces between the active surface and the part.

Conveyer belts: Conveyer systems can be built using active surfaces of suitable sizes and shapes. Each part being moved can be tracked at all times and no guides and no discontinuities at turns are required. One thing that the active surface can do that a normal conveyer cannot is to move each part at different speed and in different directions. The pneumatic active of this invention also allows for movement in opposite directions on the same conveyersurface. The term "conveyer surface " refers to such an application. Another benefit of the active surface conveyer is that parts can be oriented and held in place while a process (e.g. assembly) takes place without hard fixtures. This makes it ideal for flexible assembly. One part can be stopped for assembly while other parts continue to move.

Reduced friction surface: Pneumatic active surface devices can replace wheels, roller bearings, and the like.

Assembly: The device of this invention can perform assembly operations. For example consider a situation where a part A is to be inserted into a part B. If there are two opposing conveyer surfaces with a clearance larger then the height of A+B then type A parts can be carried on one surface while type B parts are carried on the other. The conveyer surfaces sense the location of each part and feed that information to a controller that calculates how parts should be aligned in the fastest possible way and controls the conveyer surface to achieve this alignment. Once aligned, the parts are assembled by one part being rejected from one surface and sent towards the other, preferentially from the upper surface to the bottom surface and moved off to the next operation. In this way parts can be assembled in any orientation and at any place along the two conveyer surfaces.

Sorting: The device can be used for sorting loose parts spread over the surface if the device is programmed to sense differences between the different parts. These differences could be variations in size or shape or differences in magnetic properties, all depending on the nature of the part and the type of active surface. Information from the sensors can be used to determine the direction the individual parts are moved, thus forming the basis of sorting.

Parts orientation and parts feeding: If the different sides of parts look different or feel different to the sensors in the array, parts can be sorted according to the characteristics of the surface facing the active surface. If the wrong side is up the device can flip the object. As each part can be rotated individually, parts with the right side up can be oriented within the plane and presented in a uniform way, for example to a production system.

Flexible materials handling: The active surface device of this invention provides several benefits by replacing rollers in paper and textile handling machines with active surfaces. The position of the material is known at all times, if the material is deviating from the desired direction corrective action can be taken before the system jams. Thin sheets of active surfaces can replace large rollers and there are no moving parts, except the valves, that require maintenance.

Sensor surface: The sensory capabilities of the active surface system of the invention can in some applications become the most important attribute. For example, grippers often obstruct the view of a machine vision system making closed loop control very difficult. An active surface acting as the gripper, at the same time being the sensor system, overcomes this problem. In other circumstances measuring the geometry of parts as they pass by can be an important task (e.g. in quality inspection) and building a conveyer surface into an assembly line can provide a very elegant solution to this need.

Processing surface: Selected conduits or tubes of the device could be adapted to discharge various chemicals, e.g., gases, dyes, or reactants, thereby enabling the active surface to process the object being handled. Most importantly, the treatment can differ depending on the location so some portion of the object gets one treatment while other portions are treated differently.

Position control of rigid objects

The active surface device of this invention is suitable for use in open loop, quasi-closed loop, and closed-loop control strategies for the motion of rigid objects on active surface devices. Open loop control is a movement of an object on a surface of the active surface device without sensing of actual position of the object. Although the position of the object is not known it is assumed that the object will stop in a desired position. The method often works but occasionally the object gets stuck on the surface or may deviate from the desired track. Therefore closed-loop control has been developed. In the case of quasi-closed-loop control the location of the object is verified at the end of the motion path, only, not at any intermediate steps. In closed loop control the exact position of the object on the surface is measured frequently and the current position of the object is used as close-loop information for the position controller. With the closed-loop control method it has been possible to avoid problems relating to objects getting stuck and it is possible to detect if an object has been blown away. The method is also more tolerant of disturbances such as a change of input pressure of the device.

Three basic motions of a single object are desired translation, rotation, and flipping.

Each of these motions can be addressed using each of the three basic approaches mentioned above. For each type of motion and each approach there are many different implementations, for example there are many different approaches for open-loop translational motion. Furthermore the nature of the object to be handled will influence the approach taken.

Figure 2:
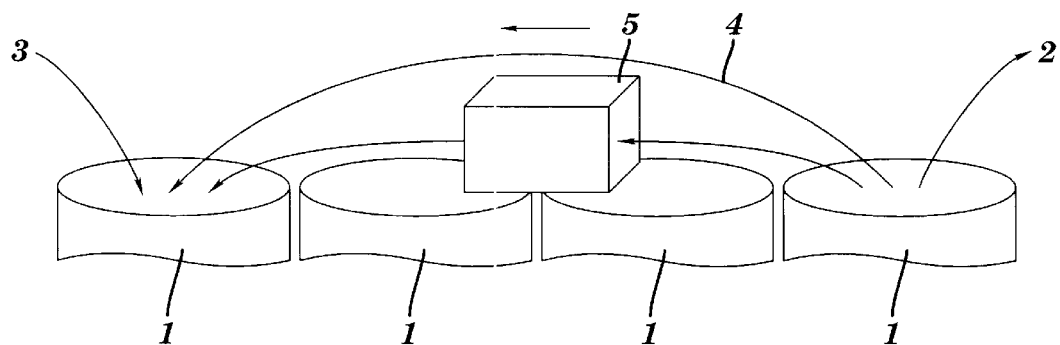
FIG. 2 is a schematic representation of the basic function of the PASD.

The basics of how an object is moved on the surface comprising tubes are illustrated in FIG. 2. The difference of the pressure between a sucking and a blowing tube cause the air to flow from the blowing tube 2 to the sucking tube 3 in the direction of arrow 4. The airflow delivers a force in a direction from the blowing tube to the sucking tube. If the air flow force is higher than the friction force between the surface and the object 5, the object moves in the direction of the airflow. If the object is too heavy or it the friction force is too high then another similar technique is used. This technique works in the same way as previously described, except that tubes, which are covered by the object, have to be set to blow, so friction between both surfaces is decreased.

Figure 3:
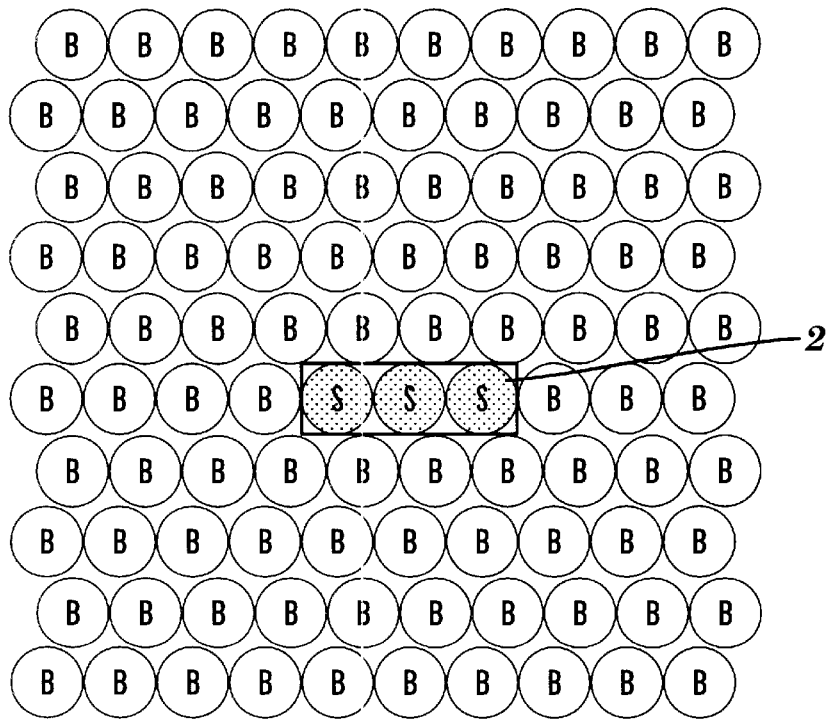
FIG. 3. Is a schematic plan view of the pressure field containing a horizontal object to be moved.

Stability of the object end-position for a described basic open-loop motion assures the pressure potential field represented in FIG. 3. Tubes with letter B (blow) represent positive pressure; tubes with letter S (suck) represent negative pressure. If the object 2 in a horizontal position moves out of the end-position due to disturbances the airflow forces which point in the direction from blow to suck move the object back into the end-position. Due to the pressure potential field the position and orientation of the object on the active surface device is stable. This stability is valid also for an example of a rigid block in vertical position. If the homogenous rigid block in the vertical position comes out of equilibrium the airflow force and the force due to suction beneath the block stabilize it into the vertical position.

Reliability of the open-loop trajectory tracking of object motion is assured by a step by step control approach and the motion could be considered as quasi-stationary. In fact, the object can be moved on the active surface device in either horizontal or vertical position.

Open-loop Translation

Figure 4:
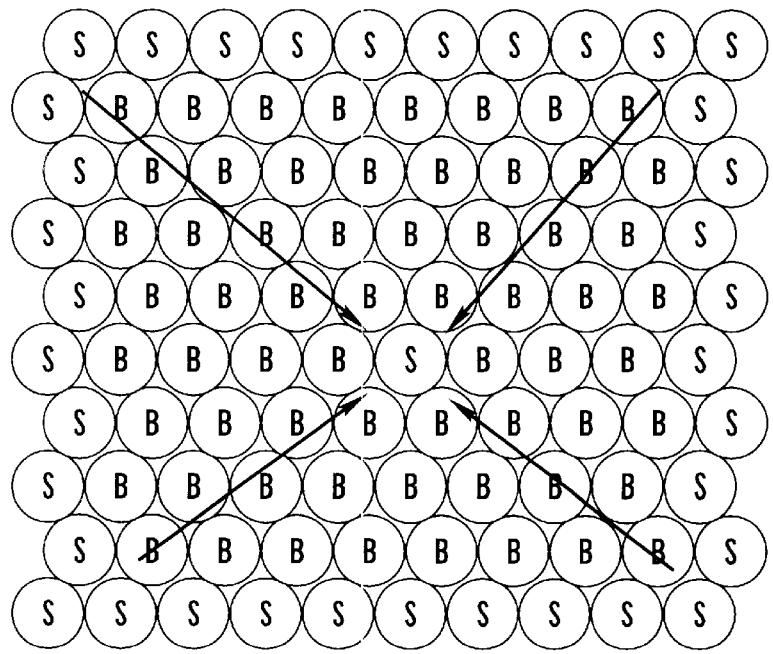
FIG. 4 is a schematic plan view of the converging wave for translation of an object.

The generally preferred applicable method for open-loop translation of objects is herein called "converging waves". It is based on a method originally developed for a MEMS mechanical actuator array. It has been tested and used for smaller objects, covering an area square of from 1 to 15 tubes (3 by 5 tubes). The scheme of the "converging waves" procedure is shown in a FIG. 4.

Repetitive circles or squares of tubes sucking waves converge towards the tube where the center of the object should land. All objects, which can be found within the area covered by the waves move towards the center tube and stop in that position. All tubes other than the center tube and the tubes of the converging sucking waves are set to blow. The repetitive converging waves generate both a force and a vibration, which are needed to move the object on the surface. The frequency of waves can be changed. If the frequency is to high, the object can move too quickly and result in overshooting the desired end-position. In fact the frequency of the value should be dependent on the dynamics of the object and the surface such as friction between the surface and the object, the height of the object, and the like. The distance between two successive converging waves must be at least as large as the length of the object. This is because if the object on the surface covers more sucking tubes in two successive waves at the same time then the element becomes locked into position and will not move at all. Generally a condition for moving an element is that only one of the tubes covered by the object need be set to suck. On the other hand, if all tubes below the object are set to blow then the element is easily blown away from the surface. For larger objects for example 5 by 5 tubes, one sucking tube may not be enough to prevent the object from being blown away. It may be necessary to increase the number of sucking tubes in case of larger objects on the surface.

Open-loop Rotation

This method can be described as a moving sucking line. The procedure for rotating the object about a user defined center point is as follows. The operator chooses the center point, which is on one of the corners of the object. The user also selects a desired point (converge center). A line between these two points is the new desired position for the edge of the object. The desired point has to be chosen close to (or in a neighborhood of) one of the corners of the object that is far away from the center point. The desired point has to be in the direction of the desired rotation. During rotation of the object all tubes are set to blow except those forming a line between the center point and the desired point. If any of the tubes forming this line, other than the center of rotation, are covered by the object they must be also be set to blow. If they do not blow they will lock the object down preventing it from move as desired. Of course both the center and the desired points have to be set to suck. In order to induce the required vibration there are also repetitive waves of sucking tubes converging towards the desired point. The vibrations are needed to prevent an object with sharp edges to get stuck in a gap between the rows of tubes. The line between the center point tube and the desired point, converge center tube or the desired tube, represents the sucking line. The curve from the opposite side of the center point of the object to the direction of desired point show the direction of rotation of the object about the center point.

Open-loop Flipping

Flipping an object consists of turning an object around so the side originally facing the active surface will be facing away from the surface. This involves motion out of the plane of the active surface and is therefore more challenging than rotation and translation within the plane. The gaps between the tubes are usually a complicating factor in the open-loop translation and rotation control techniques because an object cannot slide smoothly and often gets stuck at the edges or in the gaps. Vibration techniques such as "converge waves" have been used to prevent objects sticking with their sharp edges in the gaps. In case of a flipping operation the groves are desired or may be required. Before initiating the flip a sharp relatively straight edge of the object is aligned with a grove in the surface and the tubes along this edge are set to suck. Then the object is lifted up to approximately 90 degrees by blowing through all tubes, which were covered by the object and were sucking the object a moment before. After the object has been lifted up to 90 degrees and rests on the end suction is initiated on the other side of the sucking line so the object is laid down on the other side. The step-by-step procedure for how to flip an object along a line of sucking tubes is as follows:

Step 1: suck the object and then set to suck on the sucking line.

Step 2: set to blow, first to the third and then to the second row, of the object. The object slowly slides towards the gap between the sucking line and the first row covered with the object. After this step the sharp edge of the object is stuck in the once the object is lifted up a little.

Step 3: the first row covered by the object is immediately set to blow. The object is lifted up on the sharp edge on along the sucking line so the object makes an angle of approximately 90 degrees with the surface. The air streams blowing out on each side of the object may assist in stabilizing the object in this position.

Step 4: tubes on the other side of the sucking line are changed from blowing to sucking and the object is sucked down on the surface.

Figure 5A:
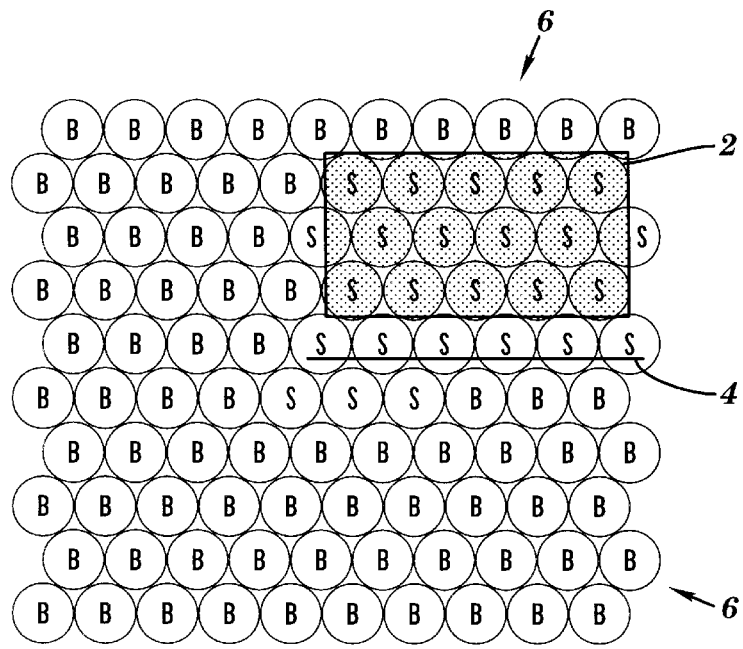
FIGS. 5a and 5b are schematic views showing the position of an object during the steps of flipping an object.
Figure 5B:
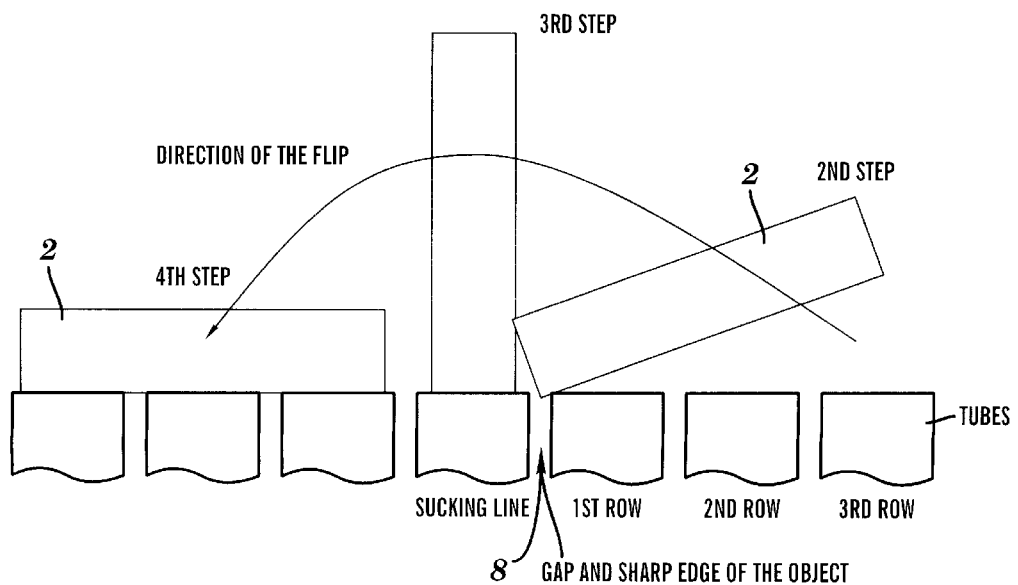

FIGS. 5a and 5b illustrate the flipping technique. FIG. 5a shows the starting arrangement of object 2 and sucking line 4 on the active surface formed by tubes 6. Blowing tubes are marked B and sucking tubes are designated S.

FIG. 5b shows the sequence of steps as described above. Object 2 is shown as angled in a partially raised position with a lower edge at gap 8 according to 2d step. Object 2 is in a vertical position at 3d step and in a horizontal flipped position in $4^{th}$ step. Legends of FIG. 5b correspond to the descriptive text.

Closed-loop Translation

It is desirable to incorporate the feedback information regarding position of the object to prevent the object getting stuck on the active surface device, as it is often a case if open-loop control techniques are used. The basic steps of the closed-loop translation control are:

Step 1: user defines the desired end-position (target).

Step 2: the position of the object is measured.

Step 3: motion is planned and actuation is used to move the object.

Step 4: the new position is measured.

Step 5: if the object has not reached the desired position steps 3 and 4 are repeated, otherwise the process is stopped.

In step 1 the user clicks with a mouse on a desired position on the screen of the PC which is used as a man-machine communication interface. The position of the mouse is translated into the tube number used as an end point of the closed-loop translation.

Steps 2 and 4 are the same. They sense the position of the object on the active surface device and calculate the length of the object in X and Y direction of the active surface device.

Step 3 calculates a position error in the X and Y directions. It also calculates the direction and length of the "sucking line" which is used as an actuating force to slide the object towards desired position. The length of the sucking line for a movement in the Y direction is the same as the rectangular projection of the object onto the X-axis of the active surface device. It is similar for a movement in the direction X where the length of the sucking line is equal to a rectangular projection of the object onto the Y-axis of the active surface device.

Step 5 is used as a decision statement. It calculates the X and Y position errors: the differences between actual and desired positions in both X and Y directions. If both X and Y direction errors are equal zero the object has reached the desired position and procedure finishes. If the desired position is not reached then steps 3, 4 and 5 are repeated.

Two closed-loop-translating techniques according to two types of actuating procedures in step 3 were developed:

A regular closed-loop translation (RCLT) and a quasi closed-loop translation (QCLT).

Regular Closed Loop Translation RCLT Technique

In this technique the object is moved one line at a time in either the X or the Y direction until the desired destination have been reached. First step 3 is executed by sucking one line in the X direction resulting in the object sliding in the X direction by one line. Then step 4 and 5 are executed. After that step 3 is executed again but only for one sucking line, this time in the Y direction. The described procedure is repeated until the destination has been reached. If, for example, the desired X position has been reached before the desired Y position, then each of the following steps will only move the object in the Y direction. Converge waves, described above are also executed to prevent the object from getting stuck during the execution of the sucking line steps (step 3). The converging waves are centered oh the end point of the sucking line with greater distance to the edge of the active surface device than the other end point of the same sucking line. The speed of movement of objects using the RCLT method is slow because each time a sucking line operation (step 3) has taken place a complete position measurement is done.

Quasi Closed-loop-translation (QCLT) Technique

The QCLT technique was developed to improve the speed of the object on the active surface device. Calculation and execution of the sucking line (step 3) in the x and y directions continue without measuring the object position on the active surface device. Two sucking waves (one in X direction, another in Y direction) can be used to simultaneously move the object towards the desired position. Once the object is expected to have reached the desired location the position is measured and compared to the desired position. If the desired position is not reached a new set of waves are calculated and executed in one or two directions as needed. The QCLT technique is an open-loop-translating procedure during the time interval between two position measurements. To prevent the objects from getting stuck somewhere on the active surface device every sucking line also has its own converging excitation. The converge-wave has a starting diameter of 3 tubes, as was the case for the RCLT technique. Experience has shown that objects are not getting stuck at all. It happens more likely that the object flips uncontrolled if it gets stuck for the moment during the open-loop-translating procedure between two position measurements and than continue the path demanded by the sucking line waves. The number of uncontrolled flips can be decreased if the positive (blow) pressure is slightly reduced.

The speed of the object movement using the QCLT technique is about 1 cm/sec, which is a tenfold improvement over the RCLT technique. The speed of the object movement depends on the dynamic interaction between the active surface device and the object. Increasing the difference between positive (blow) and negative (suck) pressures can increase the speed of the object movement. Speed can be reduced if the object is heavier or if the surface is rough, in both cases the friction is higher. If the sucking line waves are travelling to fast in these high friction cases the objects may make a small overshoot over the desired position or it may even be blown off from the active surface device because the object cannot follow the sucking lines so fast.

In general the QCLT technique allows faster object movements (1–1.5 cm/sec) while the RCLT technique allows slower (0.1–0.15 cm/sec) but more accurate positioning of the object on the active surface device.

Closed-loop Rotation

The closed-loop rotation technique is an extension of previously described open-loop rotation technique. The basic steps of the closed-loop rotation are:

Step 1: user gives the desired angle of rotation.

Step 2: the position of the object is measured.

Step 3: the actuators are used to move the object to the desired angle of rotation.

Step 4: the new position of the object is measured.

Step 5: if the object has not reached the desired angle of rotation then steps 3 and 4, are repeated, otherwise the procedure is stopped.

A user has to define two points: the center of rotation located near one end of the object and the new desired location of the other end of the object. This is done by clicking with the mouse on a screen showing the object sensed in step 1. Based on this a computer algorithm calculates the desired angle. The actual angle is calculated from the line constructed between both ends of the objects as observed in step 1. The computer algorithm measures and calculates all three points (an actual or desired center of rotation, an actual end of the object and a desired end of the object) in steps 2 and 4. An actuation is executed to move the object from the actual angle to the desired angle (step 4). If the object has not reached the desired angle or occupied the desired position point the algorithm repeat steps 3 and 4 but with a new desired angle of rotation. The algorithm constructs a new desired line based on the original desired end point increased by one pixel away from actual line. Repeating steps 3 and 4 with a new desired angle, little further away from the controlled object, is particularly needed in a case when the object does not have a flat bottom. If the desired angle or desired position has been reached the algorithm finishes the procedure in step 5. Converging waves are also executed to prevent the object, particularly objects with sharp edges, from getting stuck during the execution. The converge waves are centered on the desired end point of the sucking line.

Closed-loop Flipping

The closed-loop-flipping technique uses the same basis as the open-loop-flipping technique described above. The only difference between them is that a computer algorithm is used to determine whether the object is flipped or not. The necessary conditions for flipping are the same in both techniques: a sharp edge of the object and an existing gap between tubes on the active surface device. Because some of the edges on the object are not sharp enough or some of the gaps between tubes are not deep enough, or a combination of both reasons the open-loop flipping technique may not work. Therefore, it becomes important to identify whether or not the task has been completed successfully. An indirect method is used to determine if the object actually has been flipped:

Step 1: the object is sensed in its original position.

Step 2: the object is attempted flipped using the open-loop-flipping technique.

Step 3: the object is sensed in its new position.

Step 4: the new and old positions are compared: if they differ for more than three rows the object has flipped regularly (continue with step 5), if not then algorithm repeats the complete procedure from step 1 to step 4.

Step 5: the end.

Using higher positive (blowing) pressure can increase the percentage of successfully finished open-loop-flipping attempts. However, unfortunately the number of cases where the object is blown off the surface is also increased when the pressure is increased too much.

Using Tools on Active Surface Device

Tools are objects, other than the parts being handled, which can be placed on the active surface device. They are used to improve the handling or processing of the parts. For example, both open-loop and closed-loop position control techniques for rigid objects have some disadvantages, namely relatively slow movement of the part and the recognition of the part size is limited to the footprint, so the third dimension height cannot be observed. With use of specially designed tools it is possible to overcome such problems and Increase the speed of a movement on the active surface device.

Figure 6:
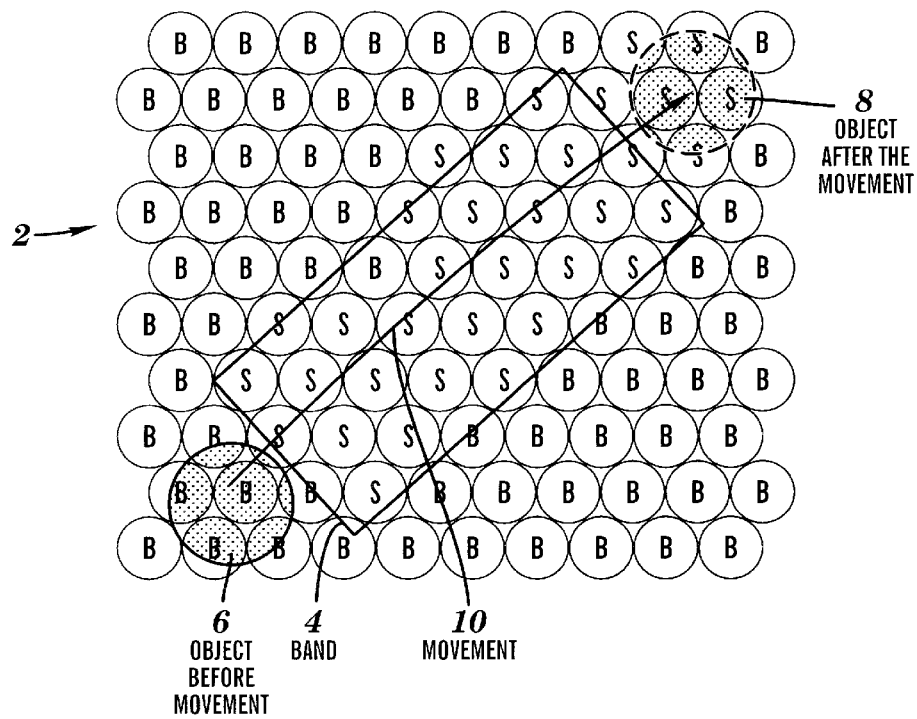
FIG. 6 is a schematic plan view of a PASD using a tool to increase the speed on the surface during translation.

As mentioned above, the friction force between the object and the active surface device limits the speed of an object moving on the active surface device. So, if the friction force can be reduced the speed of the motion can be increased. Lowering the general friction of the surface is not an option, as this will prevent operations like flipping of objects. A successful solution to that problem is the use of special tool that can tremendously decrease the roughness of the surface over which the object actually travels and therefore friction forces between the sliding surface and the object during the movement. This special tool can be a simple plastic strip or band, which is used as a low friction path between an initial position and a desired position of the object on the active surface device. The plastic band has to be thin and may be flexible the method of increasing the speed of the movement on the active surface device is described below and illustrated in FIG. 6.

Step 1: Place a thin polyvinyl chloride band 4 of proper dimension on the PASD 4 between initial position 6 and desired position 8 of the object. It is possible to move the object along trajectory 10 from one place on the active surface device to another place.

Step 2: Detect the position of the band and set all covered tubes of the active surface device on suck, so the band is fixed during the next steps.

Step 3: All other tubes on both sides of the band have to be set to blow.

Step 4: The object is released from the current position by switching to blow in tubes which were covered by the object and setting to suck the tubes of the desired position on the other side of the PVC band in the same time.

Step 5: The object slides from one end to the other end of the band very quickly.

The speed of the movement using the described method was approximately 10–15 cm/sec, which is 10 times greater than the QCLT method described above. Tests were made with a length of the plastic band of about 6 mm. The length of the tool can be longer than what was used in the described tests depending on the materials and parts involved.

Positioning of an Object on a Flexible Band

Figure 7:
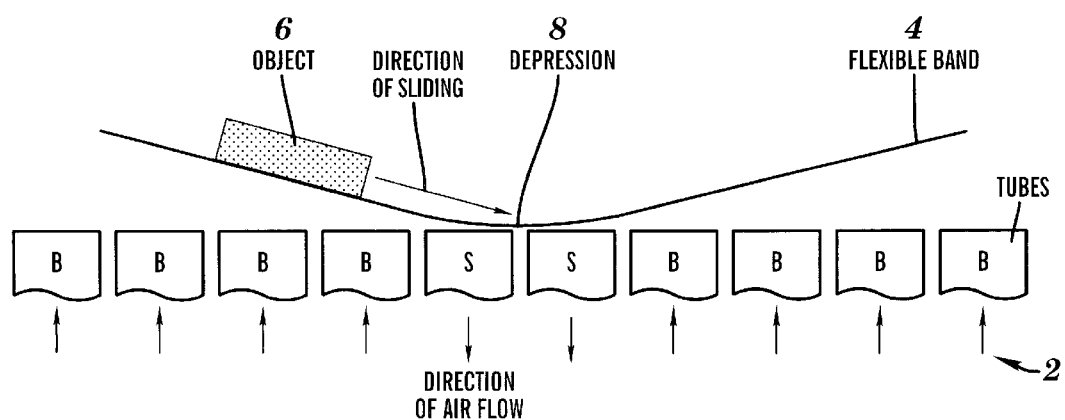
FIG. 7 is a schematic sectional view of the use of a PASD to position an object on a tool.

As described above the tool was used as a sliding surface on the active surface device to bring the object from one end to the other in a short period of time. A flexible low friction surface can be used to position an object on the surface of the tool as described in this section and illustrated in FIG. 7. The method is an open-loop control technique for moving an object on the top of the flexible plastic tool surface. Low friction force between an object and the tool laying on the active surface device is essential.

Step 1: the strip 4 of flexible material is placed on the active surface device 2 and the object 6 is placed on top of the flexible material or the band 4.

Step 2: The valves are set to suck somewhere in the middle of the band 4 i.e., the position to which the object is to be moved, and set to blow on each side of the sucking region.

Step 3: The object travels from the elevated portion above the blowing tubes to the depression made by the sucking tubes because of the gravitational force combined with the low friction between the object and the flexible band.

Step 4: If the depression on the band is moving the object will follow it on the top of the band.

The speed of movement with this method was approximately 1–1.5 cm/sec.

Bridge Tool

The vacuum sensing techniques described above measure only the two dimensional area or footprint of the object. It is therefore possible to obtain only a two-dimensional picture of the object on the surface while the third dimension (height) remains unknown. A bridge tool having a known clearance above the active surface and a horizontal passage sufficient to allow passage of the objects to be sorted can be used for determining the height of objects or sorting base on height. If an object can pass under the bridge it is known that the height of the object is smaller than the distance or level between the surface and the lower surface of the bridge tool. In this way it is possible to roughly determine the height of an object. It may be necessary to have several different bridge tools to be able to distinguish between different height groups.

Sorting

Sorting involves identifying the size or type of an object by means of the system sensors or an external vision system that may be linked to pattern recognition software. Based on the identification suitable motion algorithms can be applied to the respective objects, for example moving one type of object to one location and other objects to other locations or positions.

If sorting for size and objects smaller than a selected number (n) of tubes are to be removed, waves with a distance of n tubes are used to move the objects over the surface. Objects larger than n tubes will be clamped down at all times and will not move while all smaller objects will move.

What is claimed is:

1. A pneumatic active surface device for manipulating miniature objects which comprises an array of parallel fluid conduits, the ends of which form a smooth surface on which an object is observed and manipulated and which are conduits for leading a gaseous fluid, including air, to and from the surface, variable position valves associated with each conduit which control airflow through each conduit, a pressure sensor attached to at least some of the conduits between the active surface and the valve for reading the pressure in the tube, a pressurized gaseous fluid source and a vacuum reservoir connected to each conduit, means for operating the valves individually to provide vacuum or positive pressure to individual conduits, and means to process and display individual sensor output and control the position of the individual valves.

2. A pneumatic active surface device for sensing, locating, holding, releasing, and moving an object on said surface comprising:

a) a plurality of gaseous fluid flow conduits arranged in a parallel array to form the surface of the pneumatic active surface device, b) a variable valve connected to each conduit, c) a vacuum source, d) a source of gaseous fluid, e) a pressure sensor connected to each conduit between the surface and the valve or reading the pressure in the conduit, f) a vacuum manifold and a gaseous fluid manifold in communication with said vacuum and air sources and said valves, g) means to process and display sensor output and to control the position of individual valves.

3. A pneumatic active surface device according to claim 2 in which the tubes are arranged for maximum packing.

4. A pneumatic active surface device according to claim 2 in which the compressed gaseous fluid is air.

5. A pneumatic active surface device according to claim 2 in which the surface is provided with a tool.

6. A pneumatic active surface device according to claim 2 arranged to form a conveyer line.

7. A pneumatic active surface device according to claim 2 in which the active surface is a flat body having a one or more fluid conduits passing through from one surface to the other surface.

8. A pneumatic active surface device according to claim 2 in which the valve is a 2 position, 3 position, or proportional position valve.

9. A pneumatic active surface device according to claim 2 in which the sensors are force sensors.

10. A pneumatic active surface device according to claim 2 in which the surface is provided with a tool comprising a thin strip of low friction material.

11. A pneumatic active surface device according to claims 10, in which the low friction material is polyvinyl chloride.

12. A method for moving objects which comprises providing a pneumatic active surface device including an array of parallel gaseous fluid conduits, the upper surface of which form a smooth surface on which an object is observed and manipulated and which are conduits for leading air to and from the surface, variable position valves associated with each conduit which control airflow through each conduit, a pressure sensor attached to each conduit between the active surface and the valve for reading the pressure in the tube, a pressurized gaseous fluid source and a vacuum source connected to each conduit, means for operating the valves individually to provide vacuum or positive pressure to individual conduits, means to process and display individual sensor output and control the position of the individual valves, providing objects on the pneumatic active surface device, selectively blowing and sucking air through selected conduits to locate and move said object on the surface.

* * * * *